Patented Apr. 16, 1929.

1,709,277

UNITED STATES PATENT OFFICE.

JENS MÜLLER, OF HANAU-ON-THE-MAIN, AND MAX SCHUBERT, OF FECHENHEIM, NEAR FRANKFORT-ON-THE-MAIN, GERMANY, ASSIGNORS TO GRASSELLI DYE-STUFF CORPORATION, OF NEW YORK, N. Y., A CORPORATION OF DELAWARE.

PROCESS FOR MANUFACTURING 1.8-NAPHTHOXYPENTHIOPHEN COMPOUNDS.

No Drawing. Application filed October 5, 1927, Serial No. 224,271, and in Germany October 12, 1926.

The hitherto known methods for preparing 1.8-naphthoxypenthiophen f. i. by subjecting 1.8-naphthothioglycolic carboxylic acid to the alkali fushion (see Liebigs Annalen vol. 388, page 22) or by heating it with acetic acid anhydride (see German Patent No. 198,050) are lacking in yield and purity of the product obtained and are also much too complicated for the manufacture on a technical scale.

We have found a new process which allows to produce on a technical scale 1.8-naphthoxypenthiophen and its nuclear substitution products, which are valuable parent materials for the production of vat dyestuffs, in a pure state with an excellent yield. Our new process consists in heating the 1.8-naphthothioglycolic carboxylic acid and its nuclear substitution products in an aqueous solution or suspension in a closed vessel at temperatures greater than 150° and not substantially above 200° C. The addition of an electrolyte, such as sodium chloride is of an advantage.

The reaction runs probably according to the following equation (wherein the unsubstituted 1.8-naphthoxypenthiophen is taken as a specific example):

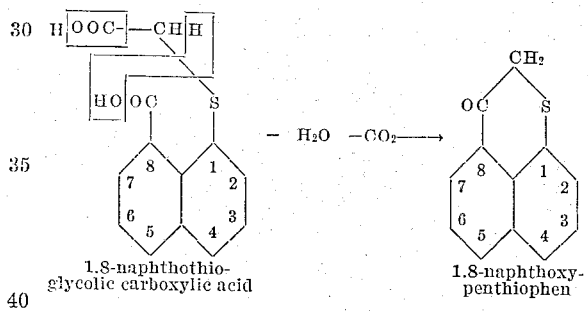

1.8-naphthothio-glycolic carboxylic acid → 1.8-naphthoxy-penthiophen

The 1.8-naphthothioglycolic carboxylic acid used as starting material for our process and a process for producing it, is described in Liebigs Annalen, vol. 388, page 20. Its nuclear substitution products may be obtained in the same manner by transforming the corresponding derivatives of the 1-aminonaphthalene-8-carboxylic acid (described f. i. by Eckstrand, Journal f. prakt. Chemie, vol. 38, page 160) into xanthogenic esters, saponifying these and condensing with monochloroacetic acid. A further method of producing the nuclear substitution products of 1.8-naphthothioglycolic carboxylic acid consists in introducing substituents into its molecule f. i. by halogenation such as bromination.

In order to further illustrate our invention the following examples are given, the parts being by weight and all temperatures in Centigrade degrees, but it is understood, that our invention is not limited to the particular products or reacting conditions mentioned therein.

Example 1.

150 parts of 1.8-naphthothioglycolic carboxylic acid and 2000 parts of water, to which preferably about 600 parts of common salt are added, are heated for some hours in an autoclave while stirring at 170-200° C. After cooling the 1.8-naphthoxypenthiophen is separated as a brownish crystalline precipitate which is filtered. It may be directly used in this form for technical purposes. One crystallization f. i. from ligroine produces it in a pure state, melting at 84–85° C. as described in literature (cf. Liebigs Annalen, l. c.).

Example 2.

15 parts of monobromo-1.8-naphthothio-glycolic carboxylic acid, prepared by treating a solution of 13 parts of the carboxylic acid in 200 parts of glacial acetic acid with a solution of 9 parts of bromine in 20 parts of glacial acetic acid in the cold and melting at 230° C. in a pure state, are heated while stirring for some hours in an autoclave with 200 parts of water to 170-180° C. After cooling down the resinous reaction product is filtered. For purifying it may be extracted with spirit, advantageously with addition of animal charcoal. From the filtrate the new monobromo-1.8-naphthoxypenthiophen is separated by adding water. It crystallizes from spirit as greenish yellow needles, melting at 130° C. It is soluble in concentrated sulfuric acid with a purple red color, turning to a dull brown while decomposing, easily soluble in chloroform and glacial acetic acid, less soluble in benzine and alcohol.

The pressure in the autoclave applied for our process corresponds functionally to the tension of the reacting agent and the temperature applied.

In the same manner other nuclear substitution products of 1.8-naphthoxypenthiophen may be obtained containing f. i. halogen nitro-, amino- and alkoxy-groups in the nucleus.

In the following claims we include under the terms "1.8-naphthoxypenthiophen compounds" and "1.8-naphthothioglycolic carboxylic acid compounds" 1.8-naphthoxypenthiophen and 1.8-naphthothioglycolic carboxylic acid themselves respectively as well as their nuclear substitution products.

We claim:

1. A process for manufacturing 1.8-naphthoxypenthiophen compounds which process comprises heating an 1.8-naphthothioglycolic carboxylic acid compound in the presence of water at temperatures greater than 150° C. and not substantially above 200° C.

2. A process for manufacturing 1.8-naphthoxypenthiophen compounds which process comprises heating an 1.8-naphthothioglycolic carboxylic acid compound with a concentrated aqueous solution of an electrolyte at temperatures greater than 150° C. and not substantially above 200° C.

3. A process for manufacturing 1 8-naphthoxypenthiophen which process comprises heating the 1.8-naphthothioglycolic carboxylic acid with a concentrated aqueous sodium chloride solution at temperatures greater than 150° C. and not substantially above 200° C.

4. As a new compound a monobromo-1.8-naphthoxypenthiophen, melting in a pure state at 130° C., crystallizing from spirit as greenish yellow needles, soluble in concentrated sulfuric acid with a purple red color, turning to a dull brown, while decomposing, easily soluble in chloroform and glacial acetic acid, less soluble in benzine and alcohol, which product is substantially identical with a compound obtainable by heating a monobromo - 1.8 - naphthothioglycolic - carboxylic acid of the melting point 230° C. in the presence of water at temperatures greater than 150° C. and not substantially above 200° C.

In testimony whereof, we affix our signatures.

JENS MÜLLER.
MAX SCHUBERT.